United States Patent

[11] 3,583,254

[72] Inventor Gordon R. Winders
 Lancaster, Ohio
[21] Appl. No. 874,347
[22] Filed Nov. 5, 1969
[45] Patented June 8, 1971
[73] Assignee Diamond Power Specialty Corporation

[54] ROLLER NUT-TYPE LINEAR DRIVE
 2 Claims, 3 Drawing Figs.
[52] U.S. Cl. .................................................. 74/424.8
[51] Int. Cl. .................................................. F16h 1/16
[50] Field of Search ........................................... 74/424.8,
 89.15

[56] References Cited
 UNITED STATES PATENTS
2,488,256 11/1949 Anderson .................... 74/424.8(C)
2,831,363 4/1958 Lohr .......................... 74/424.8(C)
3,173,304 3/1965 Strandgren ................. 74/424.8(C)X
3,214,991 11/1965 Perrin ......................... 74/424.8(C)

Primary Examiner—Leonard H. Gerin
Attorney—Harness, Dickey and Pierce

ABSTRACT: A linearly movable but nonrotatable screwshaft is actuated by a synchronous reluctance electric motor the rotor of which is formed by segment arms which concentrically orbit the screwshaft and carry roller nut sections to drive the shaft when the field of the motor rotates. The segment arms are movable radially through a small travel which is not sufficient to unmesh the roller nut sections from the screwshaft. The magnetic field of the motor urges the segment arms and roller nut sections in a radial direction corresponding to full meshing engagement of the nut sections. Spring bias moves the arms and nut sections in the reverse radial direction to apply braking pads when the field collapses.

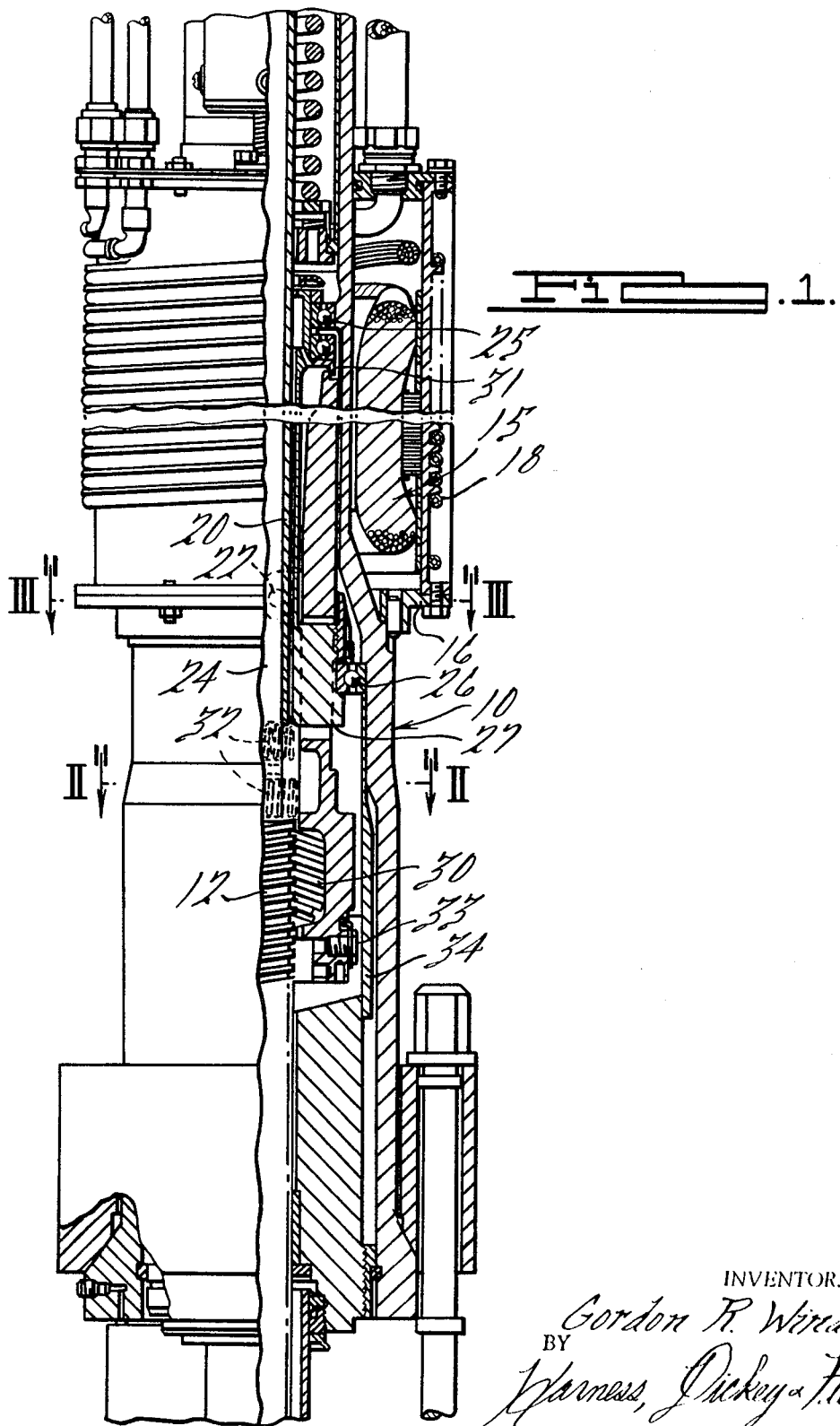

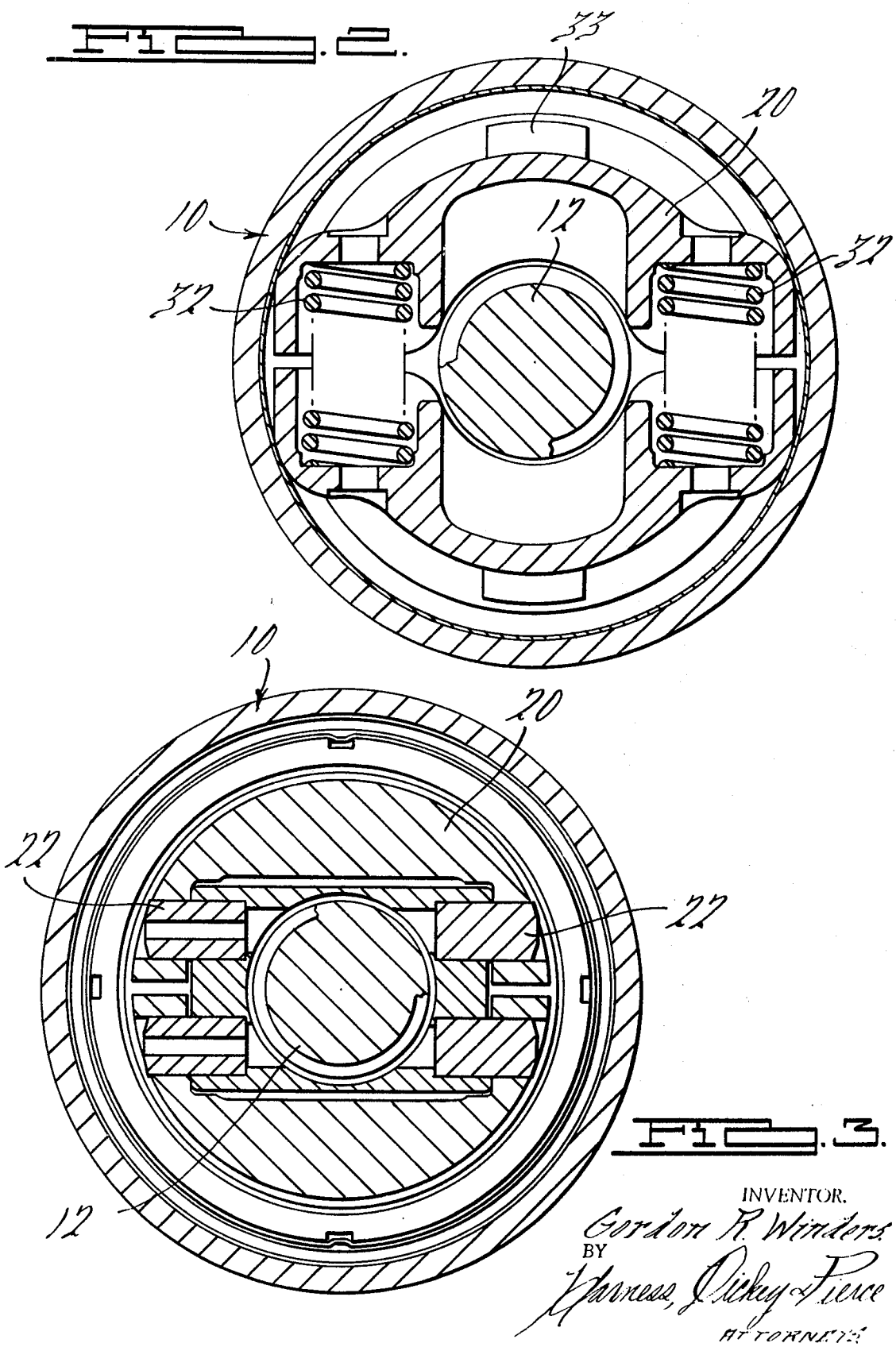

3,583,254

ROLLER NUT-TYPE LINEAR DRIVE

BACKGROUND OF THE INVENTION

A known type of linear drive, particularly for control rods, operates on the principle of a spinning nut which is rotatable but held against axial movement and meshes with a screwshaft which is moved longitudinally when the nut is rotated. In the known construction the nut is formed of a plurality of roller-type nut sections each carried by one arm of a lever of the first order and movable radially with rocking movement of the levers. The other arms of the levers constitute segments of the rotor of a synchronous reluctance motor. The levers are rockable in radial planes under the influence of the magnetic field of the motor and such rocking movement is effective to carry the roller sections into and out of mesh with the screwshaft. The levers are biased in a direction which disengages the rollers, but are held in the roller-meshing position by the magnetic field of the motor. Under normal conditions the field coils of the motor are energized at all times. When the load, such as a control rod, is to be moved, the field is rotated in the desired direction, while in the hold mode the field is energized but stationary and the screwshaft and control rod are held against movement by the stationary nut sections, the threads of the nut sections and shaft being at a wedging angle so that the nut cannot be rotated by gravity. For scram, or in an emergency such as might occur in event of a power failure, the field coils are deenergized, the magnetic field collapses, and the screwshaft and rod are free to drop into the reactor.

In certain types of applications it is not desired to permit scramming, as in the xenon control rods which may be installed in the same reactor, but the power driving requirements may be similar. The overall objective of the present invention may be summarized as to provide an improved nonscramming drive which is similar to and compatible with the previously mentioned known type of scramming drive, which employs many of the same standardized components, but which maintains meshing engagement between the nut sections and screwshaft at all times, and incorporates a positive brake which is effective to positively hold the nut sections against rotation and the shaft and load against movement when the magnetic field collapses.

Other objects and advantages will be apparent upon consideration of the present disclosure in its entirety.

BRIEF DESCRIPTION OF THE FIGURES OF THE DRAWING

FIG. 1 is a composite view partly in side elevation and partly in radial longitudinal section of a xenon type control rod drive mechanism incorporating the principles of the present invention, and FIGS. 2 and 3 are cross-sectional views taken substantially on the lines II-II and III-III respectively of FIG. 1 and looking in the direction of the arrows.

DETAILED DESCRIPTION OF PREFERRED FORM OF THE INVENTION

Reference character 10 designates generally the tubular support and housing structure which with connected parts form a tight enclosure for the control rod drive mechanism including the axially positioned and movable screwshaft 12 which with the casing 10 is arranged vertically, the screwshaft being keyed against rotation and at its lower end coupled to the control rod (not shown) which constitutes the type of load for which the mechanism is particularly designed. The field coil assembly 15 of a driving motor concentrically encircles the casing tube 10 within an enlarged motor casing portion generally designated 16. Cooling means for the motor may be provided in the form of tubing 18 for cooling fluid, mounted on the motor casing 16. The armature of the motor includes segment bar portions 20 which in their rotary driving function act like the segments of a synchronous reluctance motor. Each of the bars 20, however, forms one arm of a lever of the first order, each lever having its fulcrum on a tangent pin 22 mounted in the rotor body 24, which is journaled in the casing 10 in antifriction bearings 25, 26. The lower arm of each lever is bifurcated to extend around a radially projecting bearing supporting portion 27 of the rotor body 24 and at a position below the bearing carries a roller nut section 30 meshing with the screwshaft 12 to drive the latter as the nut assembly orbits the shaft axis. The threads of the screwshaft and of the nut sections are relatively deep and of steep-sided form, and the permitted extent of rocking movement of the levers is not sufficient to unmesh the nut sections from the shaft. When the field coils are energized the upper level arms are drawn outwardly to the extent permitted by the annular stop collar 31, which corresponds to the positions of desired full meshing engagement of the roller nut sections with the screwshaft. The levers are biased in the opposite direction by compression springs 32 which move the lower lever arms and roller nut sections outwardly when the magnetic field collapses. Only a slight degree of movement is permitted, however, the lower level arms being arrested in such outward movement by braking pads 33 on their outer surfaces at their lower ends and at such time the pads 33 bear against the inner surface of a bearing spacer tube 34 fixed to the casing tube 10.

In event of a scram signal or a failure of power which would cause the regular control rods to drop, the pads 33 are urged outwardly against the bearing spacer tube by the biasing means to firmly hold the armature assembly, nut sections and screwshaft against movement, immobilizing the load and, in a typical installation, maintaining the desired positioning of the xenon rods.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice in an effort to comply with administrative requirements of the Patent Office.

What I claim is:

1. In a linear drive including a tubular casing, a nonrotatable screwshaft axially movable therein, a sectional nut-type drive for the screwshaft including a plurality of radially movable nut sections meshing with the screwshaft, the threads of the screwshaft and of the nut sections being relatively deep in a radial direction, means biasing the nut sections outwardly away from full meshing interengagement with the screwshaft, electric motor driving means including a winding energizable to electromagnetically counterbias the nut sections into full meshing interengagement and to orbitally drive the nut sections to move the shaft, the novel combination which comprises means limiting outward movement of the nut sections beyond a position corresponding to partial interengagement, and braking portions movable with the nut sections and movable to and from holding engagement with respect to the casing concurrently with movement of said nut sections to and from said position of partial interengagement, respectively.

2. A drive as defined in claim 1 wherein said electric motor is of the synchronous reluctance type having a rotor for driving the nut sections including levers of the first order rockable in radial planes and each lever having one arm defining a rotor segment and another arm carrying one of the nut sections, the braking means comprising pads carried by said last-mentioned arms.